(12) United States Patent
Harvey et al.

(10) Patent No.: US 9,323,671 B1
(45) Date of Patent: Apr. 26, 2016

(54) MANAGING ENHANCED WRITE CACHING

(75) Inventors: David W. Harvey, Newton Centre, MA (US); H. Austin Spang, IV, Hopkinton, MA (US); Gregory S. Schaffer, Berlin, MA (US); David F. Winchell, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 500 days.

(21) Appl. No.: 13/077,553

(22) Filed: Mar. 31, 2011

(51) Int. Cl.
*G06F 12/00* (2006.01)
*G06F 12/08* (2016.01)
*G06F 13/00* (2006.01)
*G06F 13/28* (2006.01)

(52) U.S. Cl.
CPC ........ *G06F 12/0806* (2013.01); *G06F 12/0808* (2013.01)

(58) Field of Classification Search
CPC .................. G06F 12/0802; G06F 12/0808
USPC ................................. 711/112, 113, 143, 156
See application file for complete search history.

(56) References Cited

U.S. PATENT DOCUMENTS

| 5,761,705 A * | 6/1998 | DeKoning et al. ............ 711/113 |
| 2004/0215900 A1* | 10/2004 | Guthrie et al. ................ 711/146 |
| 2011/0047437 A1* | 2/2011 | Flynn ............................ 714/758 |
| 2011/0082967 A1* | 4/2011 | Deshkar et al. ............... 711/103 |
| 2012/0017040 A1* | 1/2012 | Chatterjee et al. ............ 711/113 |

\* cited by examiner

*Primary Examiner* — Mark Giardino, Jr.
(74) *Attorney, Agent, or Firm* — Krishnendu Gupta; Jason A. Reyes

(57) ABSTRACT

A method and system for use in managing enhanced write caching is disclosed. In at least one embodiment, the method and system comprises performing write-back caching operations using a write cache of a storage processor of a data storage system. A first cache page corresponding to a disk location is provided in the write cache. A host is allowed to write to a second cache page in the write cache corresponding to the same disk location. Both the first and second cache pages are maintained after acknowledging the write to the host.

14 Claims, 3 Drawing Sheets

MANAGING ENHANCED WRITE CACHING

BACKGROUND

1. Field of the Invention

The present invention relates to managing enhanced write caching.

2. Description of Prior Art

Data storage systems are used within computer networks and systems to store large amounts of data, e.g., data that is used by multiple servers and client computers ("hosts"). Generally, one or more servers are connected to the storage system, e.g., to supply data to and from a computer network. The data may be transferred through the network to various users or clients. The data storage system generally comprises a controller ("storage processor" or "SP") that interacts with one or more storage devices such as one or more magnetic or solid state disk drives or other forms of data storage. To facilitate uninterrupted operation of the server as it reads and writes data from and to the storage system, as well as executes application programs for use by users, the storage system comprises a write cache that allows data from the server to be temporarily stored in the write cache prior to being written to a storage device. As such, the server can send data to the storage system and quickly be provided an acknowledgement that the storage system has stored the data. The acknowledgement is sent even though the storage system has only stored the data in the write cache and is waiting for an appropriate, convenient time to store the data in a storage device. As is well known in the art, storing data to a write cache is typically much faster than storing data directly to a disk drive. Consequently, the write cache buffers a large amount of data in anticipation of subsequent storing of that data in a storage device.

One conventional data storage system includes two storage processors and an array of disk drives. Each storage processor includes, among other things, a local write cache. The local write caches mirror each other. Mirroring the cache protects data in the event of a storage processor failure.

During operation, the storage processors perform read and write operations on behalf of one or more external hosts. Since the contents of the local write caches are mirrored, the storage processors initially attend to write operations in a write-back manner. That is, the write policy employed by the storage processors involves acknowledging host write operations once the write data is stored in both write caches. By the time the external hosts receive such acknowledgement, the storage processors may not have yet evicted the write data from the write caches to the array of disk drives.

SUMMARY

A method and system for use in managing enhanced write caching is disclosed. In at least one embodiment, the method and system comprises performing write-back caching operations using a write cache of a storage processor of a data storage system. A first cache page corresponding to a disk location is provided in the write cache. A host is allowed to write to a second cache page in the write cache corresponding to the same disk location. Both the first and second cache pages are maintained after acknowledging the write to the host.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Described below is a technique for use in managing enhanced write caching. In at least one implementation, the technique may be used to help provide a method to defer page merges, e.g., until they are no longer necessary. In general, for data integrity reasons a write I/O (a "write") from a host may be written to a respective newly allocated page in the write cache via direct memory access (DMA), and conventionally data movement is required for writes smaller than the page size as writes are committed as described below. By contrast, in at least some implementations in accordance with the technique described herein, such data movement is delayed until a future point in time or until it is no longer necessary, which can save substantial CPU time in at least some cases.

In particular, conventionally when data is being transferred into part of a page in a cache, and the prior version of that page is dirty in the cache as explained below, the new data must not overwrite the old data. When the transfer size is smaller than the cache page, it is necessary to copy the data that changed. By contrast, in accordance with the technique, a new approach for tracking that data avoids a cost of copying the data between pages. The approach avoids the allocation of the new page in simple cases, and in the other cases, delays the copying until some future point in time, possibly eliminating the need for some or all of the copying. In the approach, if in the intervening period another transfer is requested, it is transferred without requiring a page allocation, and in some cases causes the original page to be freed, i.e., de-allocated.

Conventionally, a storage system allocated a new cache page when a write arrived, transferred the data into that new cache page, and then merged the pages into one page by copying data from the old page to the new page or vice versa depending which involved less copying of data. This conventional approach incurs the expense of processor time for copying the data from one page to the other.

By contrast, at least some implementations in accordance with the technique as described herein, copying data between cache pages is reduced or eliminated, avoiding cost in processor time and memory bandwidth.

Figure 1:
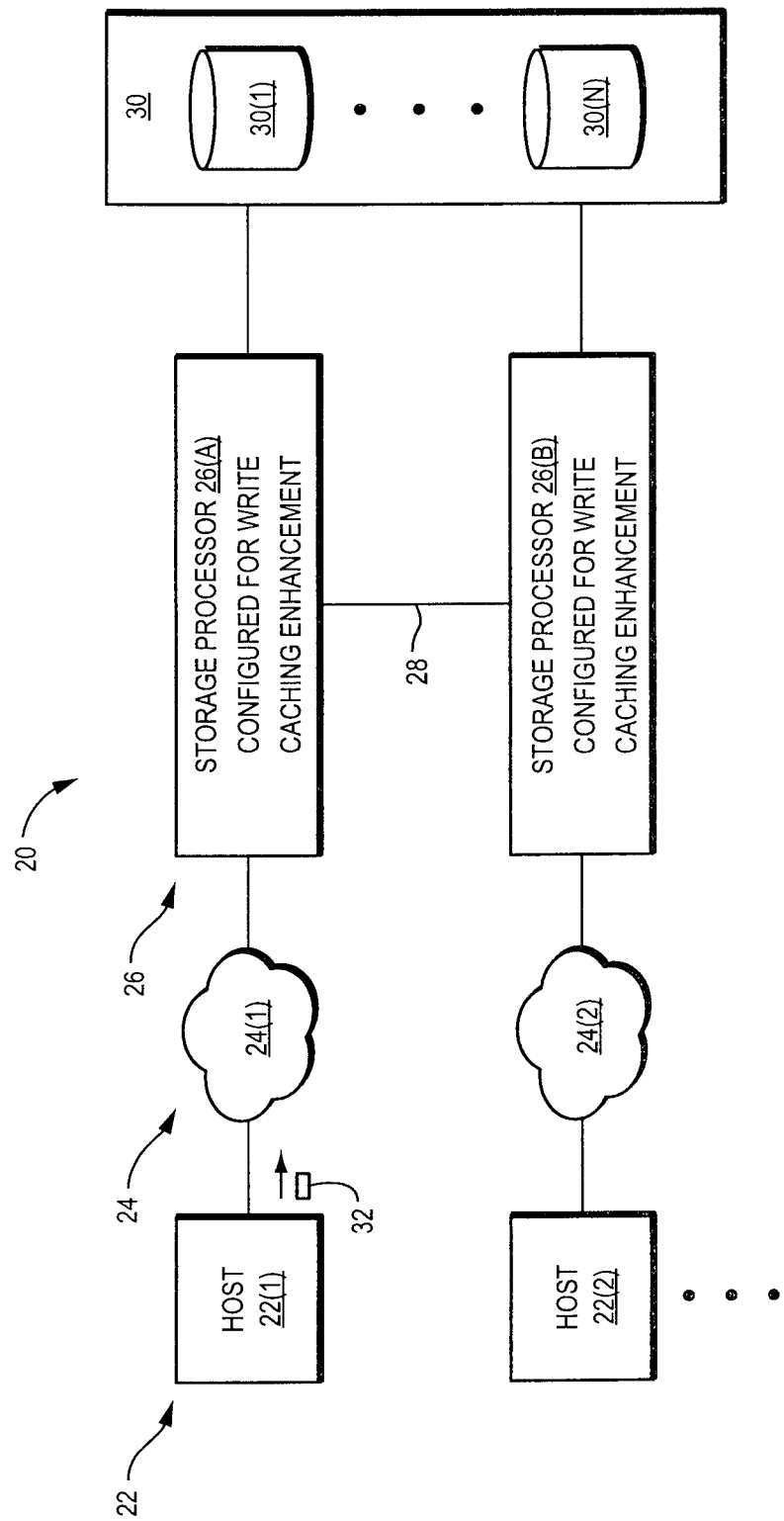
FIG. 1 is a block diagram of a data storage system which is configured for enhanced write caching.

FIG. 1 is a block diagram of a data storage system 20 which is configured for write caching enhancement for improved performance with a set of external host computers 22(1), 22(2), . . . (collectively, external hosts 22). The external hosts 22 connect to the data storage system 20 via a respective communications medium 24(1), 24(2), . . . (collectively, communications media 24).

The data storage system 20 includes multiple storage processors 26(A), 26(B) (collectively, storage processors 26), a cache mirror bus 28 and a set of disk drives 30(1), . . . 30(N) (collectively, disk drives 30). The storage processors 26 are configured to perform data storage operations (e.g., read operations, write operations, etc.) on behalf of the external hosts 22. The cache mirror bus 28 is configured to convey data between caches of the storage processors 26 thus enabling cache mirroring between the storage processors 26. The set of disk drives 30 enables the data storage system 20 to store and retrieve data on behalf of the external hosts 22 in a fault tolerant, non-volatile manner (e.g., using a RAID scheme).

Each storage processor 26 is configured to perform write-back caching in response to write operations 32 from the external hosts 22 while both storage processors 26 are in operation. That is, each storage processor 26 acknowledges completion of a write operation 32 once the write data reaches its local write cache and, if possible, once the write data is mirrored in the local write cache of the other storage processor 26. Additionally, each storage processor 26 is configured to continue to perform enhanced write-back caching as described herein. Such operation enables the data storage system 20 to provide improved response times.

Figure 2:
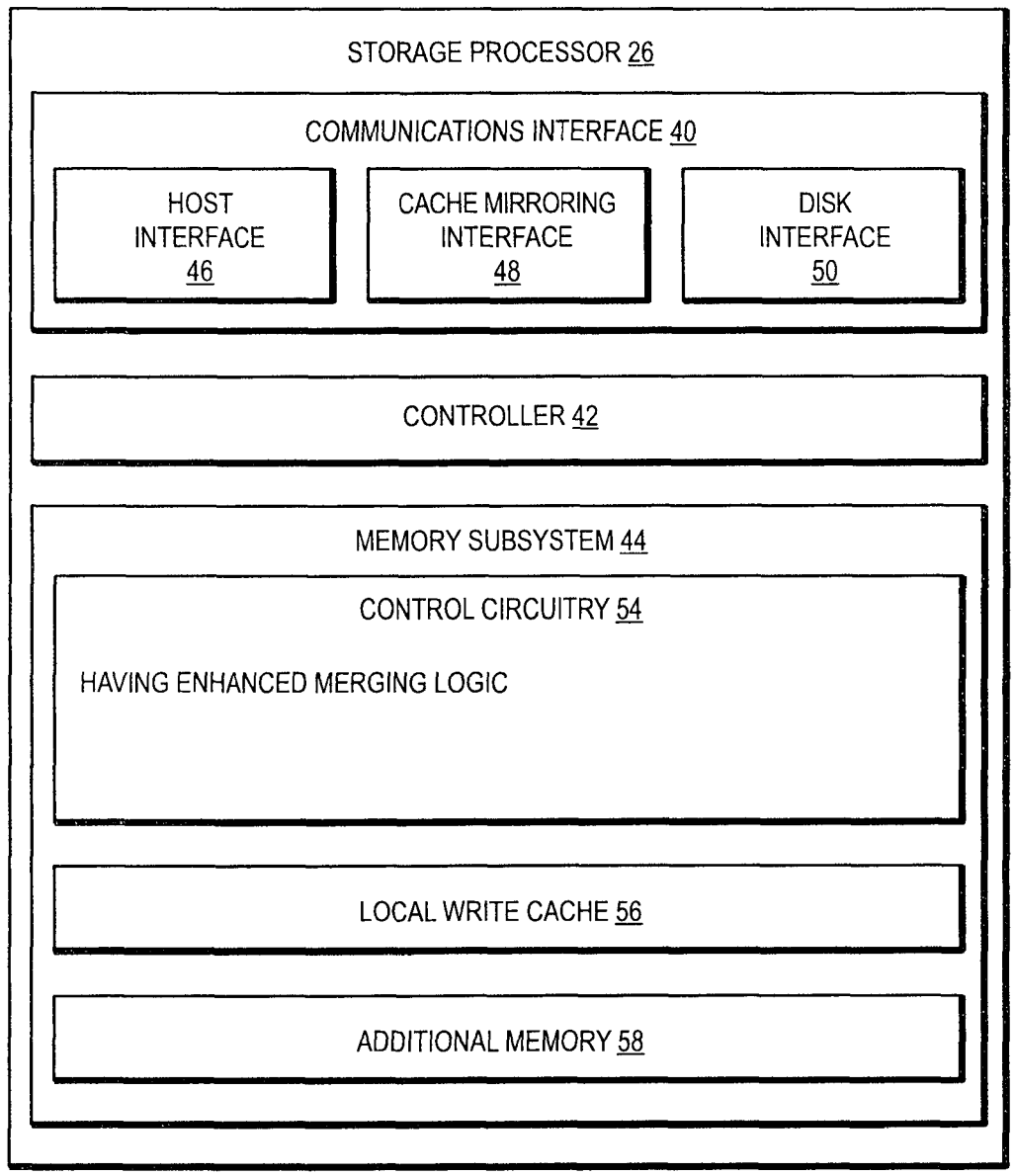
FIG. 2 is a block diagram of a storage processor of the data storage system of FIG. 1.

FIG. 2 is a block diagram of each storage processor 26 of the data storage system 20. Each storage processor 26 includes a communications interface 40, a controller 42 and a memory subsystem 44. The communications interface 40 includes a host interface 46, a cache mirroring interface 48, and a disk interface 50. The memory subsystem 44 includes a control circuit 52, a local write cache 54 and additional memory 58. The additional memory 58 includes operating system storage, firmware for storing BIOS and POST code, optional flash memory, etc.

The communications interface 40 is configured to provide connectivity from the storage processor 26 to various other components. In particular, the host interface 46 is configured to connect the storage processor 26 to one or more external hosts 22 through the connection media 24 (also see FIG. 1). The cache mirroring interface 48 is configured to connect the storage processor 26 (e.g., the storage processor 26(A)) to another storage processor 26 (e.g., the storage processor 26(B)) to enable cache mirroring through the cache mirroring bus 28. The disk interface 50 is configured to connect the storage processor 26 to the set of disk drives 30.

The controller 42 is configured to carryout data storage operations on behalf of one or more of the external hosts 22 through the communications interface 40 (e.g., see the write operations 32 in FIG. 1). In some arrangements, the controller 42 is implemented as a set of processors running an operating system which is capable of being stored in a designated area on one or more of the disk drives 30. In other arrangements, the controller 42 is implemented as logic circuitry (e.g., Application Specific Integrated Circuitry, Field Programmable Gate Arrays, etc.), microprocessors or processor chip sets, analog circuitry, various combinations thereof, and so on.

The memory subsystem 44 is configured to provide memory services to the controller 42. In particular, the control circuitry 54 of the memory subsystem 44 is configured to provide enhanced merging logic for use with the write cache 56, i.e., to provide a write caching enhancement as described herein. The control circuit 54 is further capable of performing other tasks using the additional memory 58 (e.g., operating a read cache, operating as an instruction cache, optionally vaulting contents of the write cache 56 into non-volatile flash memory or disk drive memory in response to a failure of the controller 42, etc.).

In general, the write caching enhancement helps avoid or defer page merging in at least many typical cases, so that the system can use arbitrary page sizes without excessive CPU usage. In some cases, e.g., a minority of cases, use of the write caching enhancement can double the memory used, but by deferring page merges, their frequency can be reduced and therefore performance can be improved.

Each cache page has, tracked in a page reference structure:
Sector states that identify whether each sector is valid or dirty
An "owning SP" bit
A nonOwnerHasDirtyData bit (if TRUE, non-owner dirty bits are correct)
A nonOwnerHasValidData bit (if TRUE, non-owner memory contains identical data as owner memory for valid/dirty sectors)
A NonOwnerKnowsItHasValidData bit (if TRUE, non-owner valid bits are correct; if FALSE: valid bits are all off on peer)
Cache pages also have a way to find a "second" page (key to the write caching enhancement) for the same LBA:
The primary page may have a link to the second page.
Both pages may be on the same hash list.
For correctness on any single fault (e.g., owning SP crash):
Write data can be transferred directly to any sub-page that is not dirty, provided the SP receiving the data will not interpret the data as valid if the transfer fails.
If the other SP will interpret the data is valid, it must be marked invalid prior to the transfer.
The valid or dirty bits cannot be set for the same sector in both pages at any single point in time (may apply to more than single fault correctness).
If an SP crashes, the other SP will discard any valid, non-dirty, data. Thus writes on top of valid, non-dirty sectors a permissible.
The cache page can merge the second page at any time, using an existing process (the remaining page is the one which will require the least copying of data). Bit nonOwnerHasValidData/NonOwnerKnowsItHasValidData can be used to optimize cache performance in some cases. NonOwnerKnowsItHasValidData indicates that the system cannot DMA to a valid page on the peer prior to informing the peer that it is invalid.

In a use case 1 with a sequential write of sub-pages, the transfer can occur directly into invalid sectors, and only one cache page is needed per LBA.

In a use case 2*a*, with a full page read and then write of sub-pages (e.g., read modify write when predicting some locality):
On read, an entire page is loaded into the cache on the owning SP, nonOwnerHasDirtyData=FALSE, nonOwnerHasValidData=FALSE, NonOwnerKnowsItHasValidData=FALSE, and valid bits are set for the entire page.
On write, data is transferred directly into non-dirty sectors on both SPs, nonOwnerHasDirtyData=TRUE, and dirty bits are transferred to peer SP.
Upon completion, some sub pages are dirty, and some are valid.

In a use case 2*b*: a sub-page is read, and then an overwrite write is executed of the same sub-page (e.g., random read modify write). Read and write have characteristics similar to use case 2*a*, and upon completion, there are no sub-pages that are valid and not dirty.

In a use case 3*a*, dirty pages are to be overwritten (second page pointer==NULL, nonOwnerHasDirtyData=TRUE). A new "second page" is allocated, data is transferred to that page on both SPs, dirty bits are set in the second page, corresponding valid/dirty bits are cleared in the primary page, dirty bits for both pages are transferred to the peer atomically. The primary page is freed if it has no valid/dirty data.

In a use case 3*b*, dirty pages are overwritten (second page pointer !=NULL, nonOwnerHasDirtyData=TRUE). Data is transferred to the invalid sub-pages across the two pages. The dirty bits are set for the corresponding sub-pages, and the other dirty bits are cleared. Dirty bits are transferred for both pages. The primary page is freed if it has no current valid/dirty data.

Analysis of the write caching enhancement reveals the following characteristics in at least some implementations.

If the host writes to a sub-page exactly once, only one buffer/page is needed; examples are random writes, random read/modify write.

If the host does not read the page, and writes to all sub-pages the same number of times, only one buffer/page is needed or there is a transient use of two buffers/pages, and no data copies are needed; an example is typical application behavior with a host read cache.

If the host writes different sub-pages of a page a different number of times, two partially dirty buffers are needed per cache page until a page merge, i.e., two pages are needed. This occurs on a random cache hit test.

If the host reads first, and then writes the full page, the read is irrelevant, and the characteristics above remain.

If the host reads first, and then writes less data than the data storage system read, and writes each sub-page an even number of times, only one buffer is needed. This describes half of the cases not described above.

If the host reads first, and then writes less data than the data storage system read, and writes a sub-page an odd number of times but more than once, two buffers are needed. This describes the remaining half of the cases not described above.

If merging is deferred, the following describes when merging would occur, in at least some implementations:

A NULL merge which occurs when there are two pages and one page becomes completely invalid, and can be freed at no data-copying cost.

When there is a need for free memory for pages.

In at least one implementation, having the second page on a least recently used (LRU) list of second pages allows page merges to free pages. For example, multiple classes of LRUs may be provided, with a timestamp in each entry. The decision as to which class to replace from may be a function of the class and the time since last reference of the least recently used item in that class. In a specific example, a page merge of a 60 second old page may be preferred over writing to memory a dirty page that has not been referenced for 119 seconds.

Figure 3:
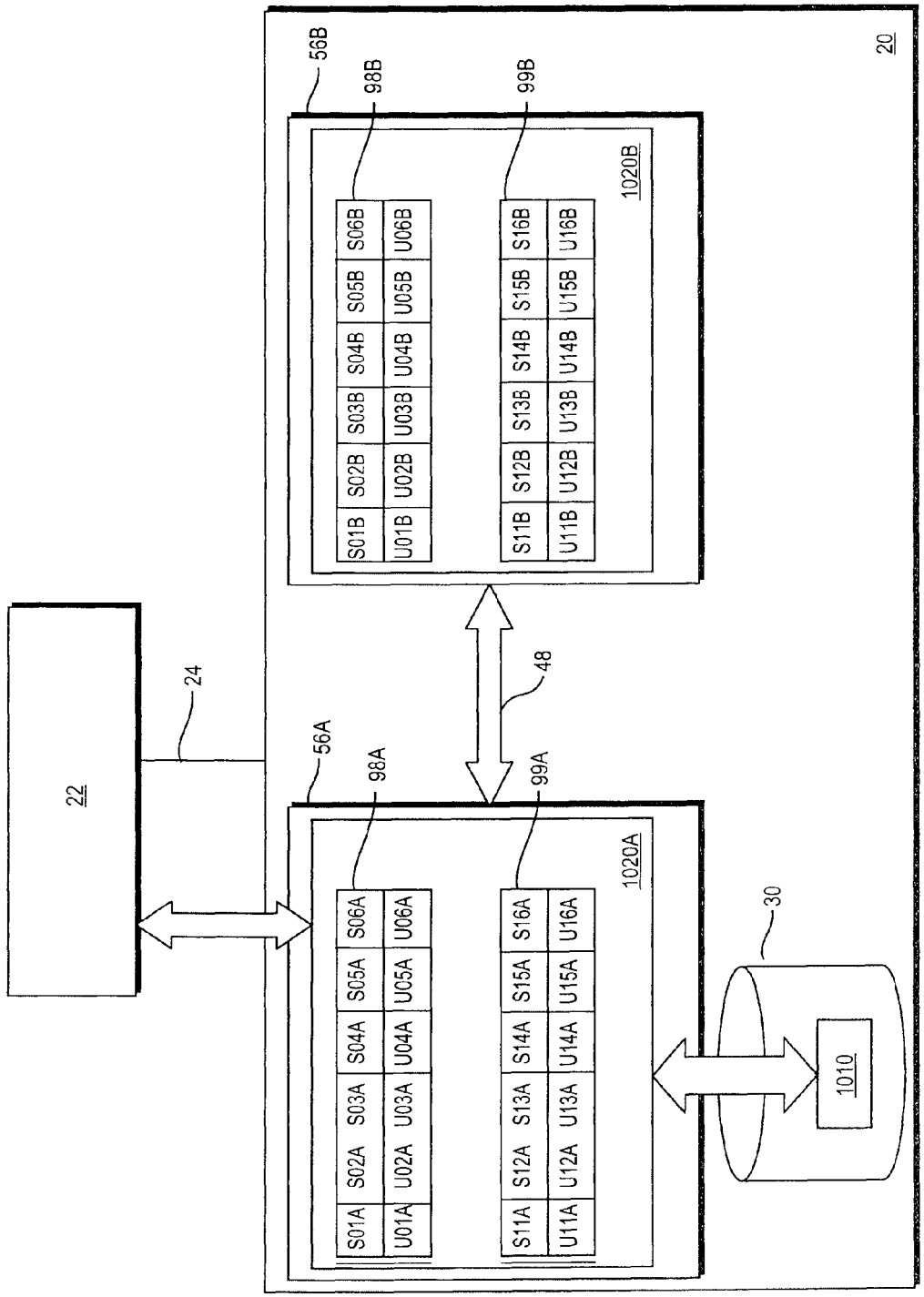
FIG. 3 is a block diagram of aspects of the storage processors of FIG. 1.

FIG. 3 illustrates an example of components and data structures that may be used in at least one implementation using the technique. Cache pages 98A, 98B, 99A, 99B may be used as described below to provide enhanced caching functionality on behalf of data portion 1010 of disk(s) 30. Each cache page includes respective sub-pages, e.g., page 98A has sub-pages U01A, U02A, U03A, U04A, U05A, U06A. In FIG. 3, each sub-page is identified by notation Uxyz, where x=0 indicates location within a primary page such as page 98A or 98B, x=1 indicates location within a secondary page such as page 99A or 99B, y=0 indicates sub-page number within a respective page, z=A indicates location in cache 56A of SPA, and z=B indicates location in cache 56B of SPB which is the peer SP. The status of each sub-page is indicated by respective status indicators, e.g., sub-pages U01A, U02A, U03A, U04A, U05A, U06A have respective status indicators S01A, S02A, S03A, S04A, S05A, S06A. Each status indicator is identified by notation Sxyz, where x, y, and z have the meaning described above.

Sub-pages of page 99A correspond to respective sub-pages of page 98A. For example, sub-page U11A corresponds to sub-page U01A, and sub-page U12A corresponds to sub-page U02A.

When host 22 writes data to cache 56A, system 20 does not acknowledge such write as complete to host 22 until such data is committed, i.e., is also stored sufficiently in cache 56B via interface 48.

Each sub-page may correspond to a sector as represented in the cache. Status is encoded by the status indicators into one of four states: Invalid (I), Valid (V), Dirty (D), and Prepared (P):

Invalid—The sector is invalid.
Valid—The sector is valid on this SP.
Prepared—For writes, it indicates that the sector contains data needed for commit.
Dirty—The sector is dirty on both SPs.

In an example, primary page 98A is allocated with all sub-pages having status I, and the host writes data to sub-pages U03A, U05A which are marked with status P in S03A, S05A, respectively. (It should be noted that sub-pages may be accessed consecutively starting at U01A instead.) The page 98A status indicators may now indicate the following:
{S01A, S02A, S03A, S04A, S05A, S06A}={I, I, P, I, P, I}

After sub-pages U03A, U05A are mirrored to sub-pages U03B, U05B respectively, status of sub-pages U03A, U05A, U03B, U05B is updated to D in S03A, S05A, S03B, S05B, respectively, and the write is acknowledged to the host. The page 98A status indicators may now indicate the following:
{S01A, S02A, S03A, S04A, S05A, S06A}={I, I, D, I, D, I}

Next, the host indicates it needs write to sectors corresponding to sub-pages U02A, U05A. Secondary page 98B is allocated with all sub-pages having status I, and the host writes data to sub-pages U12A, U15A which are marked with status P in S12A, S15A, respectively. The page 98A and 99A status indicators may now indicate the following:
{S01A, S02A, S03A, S04A, S05A, S06A}={I, I, D, I, D, I}
{S11A, S12A, S13A, S14A, S15A, S16A}={I, P, I, I, P, I}

After sub-pages U12A, U15A are mirrored to sub-pages U12B, U15B respectively, status of sub-pages U12A, U15A, U12B, U15B is updated to D in S12A, S15A, S12B, S15B, respectively, status of sub-pages U05A, U05B is updated to I in S05A, S05B, respectively, and the write is acknowledged to the host. The page 98A and 99A status indicators may now indicate the following:
{S01A, S02A, S03A, S04A, S05A, S06A}={I, I, D, I, I, I}
{S11A, S12A, S13A, S14A, S15A, S16A}={I, D, I, I, D, I}

The reason that status of sub-pages U05A, U05B is updated to I is that sub-pages U05A, U05B are now out of date, having been superseded by sub-pages U15A, U15B respectively.

(In the example, no flushing takes place, but if at this point a portion of cache 56A corresponding to disk portion 1010 were flushed to disk, this would be accomplished by reading from both pages 98A, 99A, particular the portions of such pages currently having status D, which are sub-pages U12A, U03A, U15A. After such flushing, sub-pages U12A, U03A, U15A would be updated to status V.)

Next the host indicates it needs to write to sectors corresponding to sub-pages U01A, U02A, U03A, U04A, U05A, U06A. The host writes data to primary page sub-pages U01A, U02A, U13A, U04A, U05A, U06A which are marked with status P in S01A, S02A, S13A, S04A, S05A, S06A, respectively. The page 98A and 99A status indicators may now indicate the following:
{S01A, S02A, S03A, S04A, S05A, S06A}={P, P, D, P, P, P}
{S11A, S12A, S13A, S14A, S15A, S16A}={I, D, P, I, D, I}

After sub-pages U01A, U02A, U13A, U04A, U05A, U06A are mirrored to sub-pages U01B, U02B, U13B, U04B, U05B, U06B, respectively, status of sub-pages U01A, U02A, U13A, U04A, U05A, U06A, U01B, U02B, U13B, U04B, U05B, U06B is updated to D in S01A, S02A, S13A, S04A, S05A, S06A, S01B, S02B, S13B, S04B, S05B, S06B, respectively, status of sub-pages U12A, U03A, U15A, U12B, U03B, U15B is updated to I in S12A, S03A, S15A, S12B, S03B, S15B, respectively, and the write is acknowledged to the host. The page 98A and 99A status indicators may now indicate the following:
{S01A, S02A, S03A, S04A, S05A, S06A}={D, D, I, D, D, D}
{S11A, S12A, S13A, S14A, S15A, S16A}={I, I, D, I, I, I}

The reason that sub-page U13A was written to instead of sub-page U03A is that sub-page U03A had status D at the time the write was initiated.

Next the host indicates it needs to write to sectors corresponding to sub-page U03A. The host writes data to primary page sub-pages U03A, which is marked with status P in S03A. The page 98A and 99A status indicators may now indicate the following:
{S01A, S02A, S03A, S04A, S05A, S06A}={D, D, P, D, D, D}
{S11A, S12A, S13A, S14A, S15A, S16A}={I, I, D, I, I, I}

After sub-page U03A is mirrored to sub-pages U03B, status of sub-pages U03A, U03B is updated to D in S03A, S03B, respectively, status of sub-pages U13A, U13B is updated to I in S13A, S13B, respectively, and the write is acknowledged to the host. The page 98A and 99A status indicators may now indicate the following:
{S01A, S02A, S03A, S04A, S05A, S06A}={D, D, D, D, D, D}
{S11A, S12A, S13A, S14A, S15A, S16A}={I, I, I, I, I, I}

At this point, since all sub-pages of pages 99A, 99B have status I, pages 99A, 99B can be de-allocated.

In different examples, if all sub-pages of pages 98A, 98B have status I, pages 98A, 98B can be de-allocated, in which case pages 99A, 99B become the primary pages.

At least one implementation involves objects referred to as logical pages (which may include a compound transactional page) and simple transactional pages. A logical page (e.g., page 1020A or 1020B) is the portion of a cache page reference that describes the cache pages the reference is using for its caching. The logical page itself tracks only information about the state of the data on the peer SP, along with some summary bits about the state of the data in the local pages for performance optimization. Each logical page also has a transient free list to ensure that mirrored cache pages cannot be freed and reused prior to a transaction commit. The logical page may be divided up into cache page size units. If the cache page reference describes 32 k of the volume's address space, and the cache page represents 4 k of memory, the compound transactional page has an array of 8 simple transactional pages. The simple transactional page (STP) represents a slot in the volumes virtual address space the same size as the cache page, and tracks whether data exists in the cache on a per-sector basis. For each sector, the state (i.e., status) can be invalid, valid, dirty, prepared, or dirty and prepared. In the latter case, a simple transactional page can hold both the previously committed data, and data that is about to be committed. In the prepared case, it only holds data that has not yet been committed. The commit operation includes setting all D values for which there is a corresponding P value to an I value, and then to change each P value to a D value. This sequence is idempotent, i.e., it can be repeated from the beginning if it is interrupted.

At least some implementations have one or more of the following characteristics. The host sends I/O that has a size that is a multiple of a typical sector size of 512 bytes. The cache has data, header/metadata (which describes what is in the data), and a cache tag. Linked lists are used, and a unit of tracking needs to be of significant size to avoid metadata using significant memory compared to the page itself. A host should not perform a write (e.g., a DMA write) over a sub-page that has dirty data, because such dirty data may be lost if the write fails.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for use in managing enhanced write caching, the method comprising:
    storing data in sub-pages of a first page in a write cache, wherein the sub-pages of the first page correspond to a first storage location;
    assigning a status to the data stored in the sub-pages of the first page, wherein the status relates to the validity of the data and/or whether the data has been stored persistently at the first storage location;
    receiving a write I/O to write data to the first storage location;
    storing the write data in sub-pages of a second page in the write cache, wherein the sub-pages of the second page correspond to the sub-pages of the first page;
    performing a write-back caching operation acknowledging the write I/O; and
    maintaining the first and second pages after acknowledging the write I/O;
    wherein storing the write data in the sub-pages of the second page, comprises:
    changing the status of the data stored in the sub-pages of the first page; and
    assigning a status to the data stored in the sub-pages of the second page, wherein the assigned status is different to the changed status of the data stored in the sub-pages of the first page.

2. The method of claim 1, further comprising:
    providing a storage processor with a write cache for mirroring write operations.

3. The method of claim 1, wherein the first page is associated with a page reference structure, wherein the page reference structure includes a dirty bit and a valid bit.

4. The method of claim 3, wherein the dirty bit indicates whether the first page is dirty.

5. The method of claim 1, wherein the first page includes information indicating a location of the second page.

6. The method of claim 1, wherein the second page is included in a list of least recently used second cache pages.

7. The method of claim 1, wherein each sub-page of the set of sub-pages is associated with a sector.

8. A system for use in managing enhanced write caching, the system comprising:
    a processor comprising a program logic for carrying out the steps of:
    first logic storing data in sub-pages of a first page in a write cache, wherein the sub-pages of the first page correspond to a first storage location;
    second logic assigning a status to the data stored in the sub-pages of the first page, wherein the status relates to the validity of the data and/or whether the data has been stored persistently at the first storage location;
    third logic receiving a write I/O to write data to the first storage location;
    fourth logic storing the write data in sub-pages of a second page in the write cache, wherein the sub-pages of the second page correspond to the sub-pages of the first page;
    fifth logic performing a write-back caching operation acknowledging the write I/O; and sixth logic maintaining the first and second pages after acknowledging the write I/O;

wherein storing the write data in the sub-pages of the second page, comprises:

changing the status of the data stored in the sub-pages of the first page; and assigning a status to the data stored in the sub-pages of the second page, wherein the assigned status is different to the changed status of the data stored in the sub-pages of the first page.

9. The system of claim 8, further comprising:

seventh logic providing a storage processor with a write cache for mirroring write operations.

10. The system of claim 8, wherein the first page is associated with a page reference structure, wherein the page reference structure includes a dirty bit and a valid bit.

11. The system of claim 10, wherein the dirty bit indicates whether the first page is dirty.

12. The system of claim 8, wherein the first page includes information indicating a location of the second page.

13. The system of claim 8, wherein the second page is included in a list of least recently used second cache pages.

14. The system of claim 8, wherein each sub-page of the set of sub-pages is associated with a sector.

* * * * *